US006766419B1

(12) United States Patent
Zahir et al.

(10) Patent No.: US 6,766,419 B1
(45) Date of Patent: Jul. 20, 2004

(54) OPTIMIZATION OF CACHE EVICTIONS THROUGH SOFTWARE HINTS

(75) Inventors: Achmed Rumi Zahir, Menlo Park, CA (US); Jeffrey Baxter, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,547

(22) Filed: Mar. 31, 2000

(51) Int. Cl.[7] .............................................. G06F 13/00

(52) U.S. Cl. ........................ 711/133; 711/119; 711/144; 711/145; 711/159; 712/43; 712/220; 712/227; 712/229

(58) Field of Search ................................ 711/133, 119, 711/144, 145, 159; 712/220, 227, 229, 43

(56) References Cited

U.S. PATENT DOCUMENTS

| | | | | |
|---|---|---|---|---|
| 5,471,602 A | * | 11/1995 | DeLano ....................... | 711/118 |
| 5,561,780 A | * | 10/1996 | Glew et al. .................. | 711/126 |
| 5,630,075 A | * | 5/1997 | Joshi et al. .................. | 711/100 |
| 5,778,430 A | * | 7/1998 | Ish et al. ..................... | 711/133 |
| 5,781,733 A | * | 7/1998 | Stiles .......................... | 709/203 |
| 5,895,488 A | * | 4/1999 | Loechel ....................... | 711/135 |
| 5,996,049 A | * | 11/1999 | Arimilli et al. ............. | 711/141 |
| 6,212,605 B1 | * | 4/2001 | Arimilli et al. ............. | 711/133 |
| 6,243,791 B1 | * | 6/2001 | Vondran, Jr. ................ | 711/120 |
| 6,272,598 B1 | * | 8/2001 | Arlitt et al. ................. | 711/133 |
| 6,345,340 B1 | * | 2/2002 | Arimilli et al. ............. | 711/141 |
| 6,370,622 B1 | * | 4/2002 | Chiou et al. ................ | 711/146 |
| 6,397,298 B1 | * | 5/2002 | Arimilli et al. ............. | 711/133 |
| 2001/0049771 A1 | * | 12/2001 | Tischler et al. ............. | 711/133 |

OTHER PUBLICATIONS

Gwennap, "Microprocessor Report: Intel, HP Make EPIC Disclosure," vol. 11, No. 14, pp 1–5, Oct. 1997.*
Yung, "Design Decisions Influencing the UltraSPARC's Instruction Fetch Architecture," pp 178–190, IEEE, 1996.*
Dulong, "The IA–64 Architecture at Work," pp 24–32, IEEE, 1998.*
Chan et al., "Design of the HP PA 7200 CPU," pp 1–11, Hewlett–Packard Journal, Feb. 1996.*
Thakkar et al., "The Internet Streaming SIMD Extensions," pp 1–8, Intel Technology Journal Q2, 1999.*
IBM Technical Disclosure Bulletin, "Conditional Least–Recently–Used Data Cache Design to Support Multimedia Applications," vol. 37, No., 2B, pp 387–390, Feb. 1, 1994.*
Handy, "The Cache Memory Book, Second Edition," pp. 156–158, 1998.*
PowerPC™ 601, RISC Microprocessor User's Manual, Motorola, Section 4: Chapter 4, "Cache and Memory Unit Operation", Table of Contents, pp. 4–17 through 4–21, 1993.
PA–RISC 1.1 Architecture and Instruction Set Reference Manual, Hewlett–Packard, HP No. 09740–90039, Third Edition, Table of Contents, pp. 5–171, 5–172, and 5–152, Feb. 1994.
Intel® IA–64 Architecture Software Developer's Manual, vol. 3: Instruction Set Reference, Order No. 245319–001, Table of Contents, pp. 2–47 and 2–220, Jan. 2000.

\* cited by examiner

*Primary Examiner*—Matthew Kim
*Assistant Examiner*—Stephen Elmore
(74) *Attorney, Agent, or Firm*—Kenyon & Kenyon

(57) ABSTRACT

Program instructions permit software management of a processor cache. The program instructions may permit a software designer to provide software deallocation hints identifying data that is not likely to be used during further program execution. The program instructions may permit a processor to evict the identified data from a cache ahead of other eviction candidates that are likely to be used during further program execution. Thus, these software hints provide for better use of cache memory.

38 Claims, 4 Drawing Sheets

OPTIMIZATION OF CACHE EVICTIONS THROUGH SOFTWARE HINTS

BACKGROUND

The present invention relates to a method and apparatus for providing software "hints" for the purposes of cache management in an integrated circuit.

As processor cycle times continue to decrease, management of memory latency and bus bandwidth becomes an increasingly important capability in computer systems. Contemporary processor designs often address these issues by providing on-chip or on-package cache memory. Some processors even provide multi-level cache hierarchies in which a lowest level cache, the cache closest to the processor core, is very fast but very small when measured against higher level caches. To improve hit rates and to avoid cache pollution, many processors also provide separate instruction and data caches, which enable higher hit rates due to increased code or data locality found in typical application's code and data streams. Unfortunately, the working set sizes of large applications continue to exceed the size of many current processor caches, even those with large multi-level cache systems.

Several processor designs have added instruction set extensions that permit both instruction and data prefetch instructions and/or hints. These prefetch instructions and hints allow software to initiate memory accesses early by identifying addresses of data that are likely to be needed by the software in future execution. Current prefetch instructions are either specified explicitly as data or code prefetch instructions or are specified indirectly on branch or load instructions. Currently existing prefetch hints and instructions enable software to specify a level of the memory hierarchy at which a specific data item should be allocated. This allows software that knows about the relative sizes of an application's working set and the processor's cache sizes to effectively allocate the working set in the appropriate cache level.

Current prefetch hints and instructions focus on allocation of cache lines from memory into the processor's memory hierarchy. However, they rely on the processor's built-in cache replacement policies to evict (and possibly write back) cache lines from the processor to memory. These hardwired replacement policies typically evict data on a least-recently-used, not-recently-used or random basis. In many situations, however, a software designer may know beforehand that a referenced data item is not going to be a likely candidate for re-use in the near future or ever. Consider a video decoding application by way of example. When a frame of data is decoded, the decoded image data typically is output from a processor for display. Once the decoded image data is output, it may have no further use within the processor's cache. Thus, any cache space occupied by such data could be evicted without performance loss within the processor. Currently, however, processor instruction sets do not provide a mechanism that permits software designers to identify data that is not likely to be used again during program execution.

Accordingly, there is a need in the art for an instruction set for a processor that permits a software designer to identify data that is not likely to be used during future program execution.

DETAILED DESCRIPTION

Figure 1:
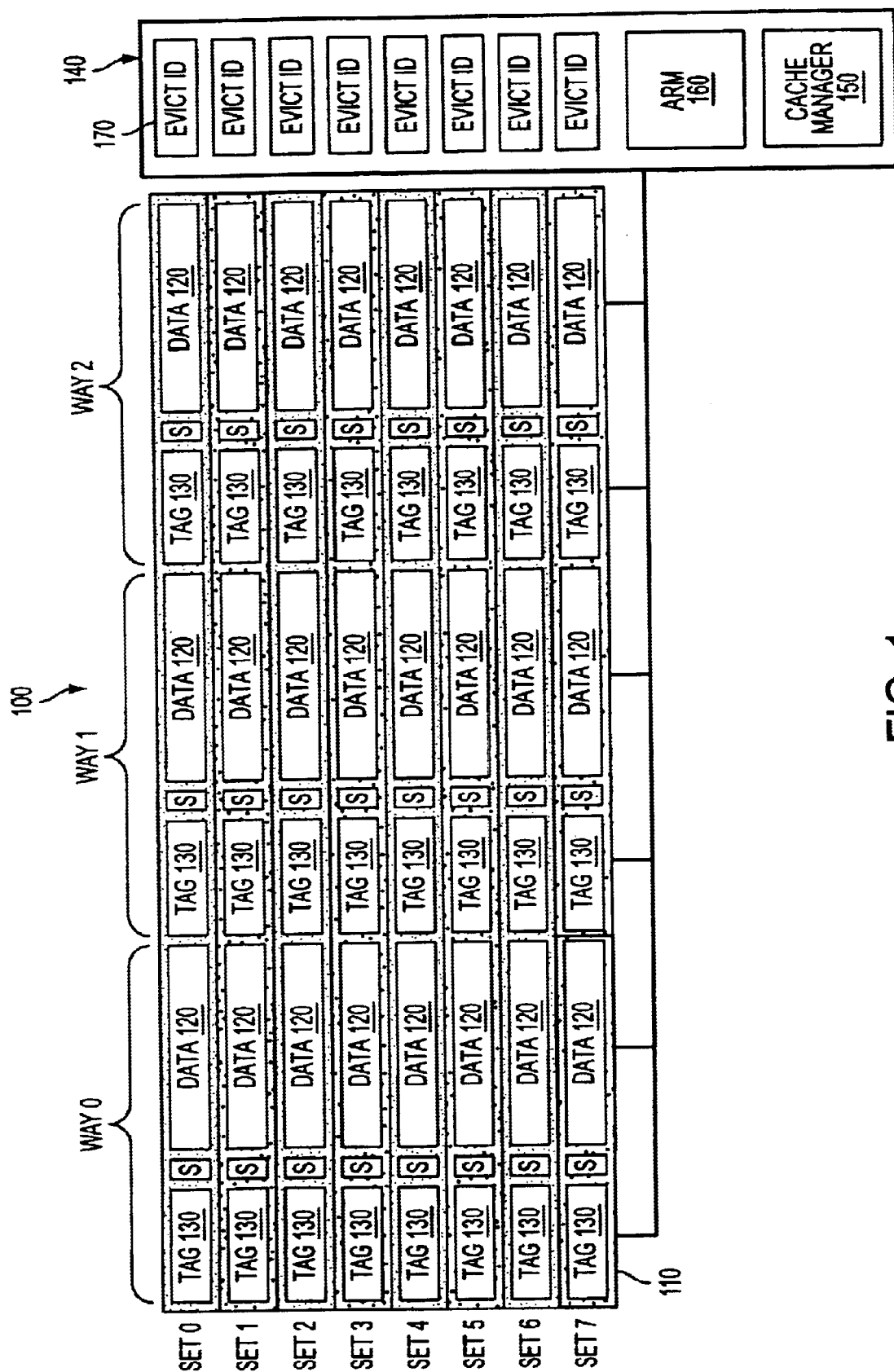
FIG. 1 is a block diagram of a cache that may find application with an embodiment of the present invention.

Embodiments of the present invention provide program instructions that permit software management of a processor cache. According to an embodiment, the program instructions permit a software designer to provide software "hints" identifying data that is not likely to be used during further program execution. The program instructions may permit a processor to evict the identified data from a cache ahead of other eviction candidates that are likely to be used during further program execution. Thus, these software hints provide for better use of cache memory.

In a first embodiment, the present invention envisions use of a DEALLOCATE instruction that addresses data that is not likely to be used during further program execution. The DEALLOCATE instruction may be used by cache management apparatus within a processor to update an eviction pointer in a cache to point to an addressed data item rather than a data item that would be next to be evicted according to a default replacement policy. The identified data may be identified as the next candidate for eviction even if the data is not truly the least recently used data available.

In another embodiment, the present invention envisions use of an atomic STORE-DEALLOCATE instruction that combines a store operation with the functionality of the DEALLOCATE instruction listed above. The STORE-DEALLOCATE instruction permits data to be stored in a specified level of cache and simultaneously identified as the next candidate for eviction. This embodiment provides an advantage in that a single program instruction performs both functions, thereby resulting in processing savings because fewer instructions are decoded and executed to achieve the desired functionality.

In a further embodiment, the DEALLOCATE or STORE/DEALLOCATE instructions may be directed to a particular levels of cache within an integrated circuit. An embodiment permits the instruction to identify one or more specific levels of cache expressly. Alternative embodiments permit the instruction to abstractly identify levels of cache (such as by targeting the instruction to "low" cache levels or "high" cache levels).

According to another embodiment of the present invention, the DEALLOCATE or STORE-DEALLOCATE instructions may be provided as software "hints," program instructions whose execution is permissive rather than compulsory. Accordingly, caches may determine whether to alter the eviction candidacy status of identified data in response not only to the DEALLOCATE instruction but also in response to the status of other units within the agent. For example, a cache management unit may determine a level of congestion on a system bus connecting the agent to system memory and, if the level of congestion exceeds a threshold, may determine not to perform the DEALLOCATE instruction at run time. By disregarding the DEALLOCATE instruction in this event, the cache management unit may contribute to higher system performance because eviction of the data from the cache back to system memory would cause an already high level of congestion to increase.

As is known, caches may be constructed according to a number of different architectures, each operating according to a number of data replacement policies. According to an embodiment of the present invention, the instructions proposed herein are intended to work in combination with known data replacement policies. For example, one data replacement policy evicts a least recently used data item when a cache must make room for storage of a new data item. During implementation of a DEALLOCATE instruction, a cache may identify a data item addressed by the instruction as the least recently used ("LRU") data ahead of other data items that otherwise would be considered the least recently used. In this regard, the DEALLOCATE instruction "trumps" the eviction order provided by a default replacement policy.

According to an embodiment, the instructions proposed herein need not evict the data addressed by the instructions. Again, they merely reposition the eviction status of a data item from a position provided by a default replacement policy. Having been repositioned, processing for the instruction may terminate or be handed on to a next level of cache in a multi-level hierarchy. Thereafter, the data may be evicted according to traditional eviction controls provided in the cache.

FIG. 1 is a block diagram of one style of cache 100, called a "set associative cache," that may find application with an embodiment of the present invention. The cache 100 may include a plurality of cache lines 110 organized into an array of sets and ways. The example of FIG. 1 illustrates eight sets and three ways but the principles of present invention are appropriate for use with caches of any dimension. Each cache line 110 may include a data field 120, a tag field 130 and a state field (labeled "S"). The data field 120 stores a data item. The tag field 130 may store a predetermined portion of the associated data item's address such as in system memory. The state field S may store a value representing the data's cache coherency state, e.g. whether the data stored in the data field 120 is as current or more current than a copy of the data stored in system memory. In this regard, the structure of the cache 100 is well-known.

The cache 100 also may include a cache manager 140, a state machine that controls cache operation. The cache manager 140 may include a number of functional units, including a hit/miss engine 150, an allocation/replacement manager ("ARM") 160 and one or more eviction identifier registers 170. For an embodiment having a set associative cache 100, there may be an eviction identifier register 170 provided for each set in the cache. Thus, the example of FIG. 1 illustrates eight eviction identifier registers. Other cache architectures may provide a different number of eviction identifier registers. Again, in this regard, the structure of the cache 100 is well known.

This hit/miss engine 150 responds to new data requests made to the cache 100 by determining whether the request hits the cache. A data request is said to "hit" the cache if it addresses data that is stored by the cache 100. Otherwise, the data request misses the cache 100. The hit/miss engine 150 may compare the value of an address received with the data request against the address values stored in the tag fields 130 throughout the cache 100. In a set-associative cache, each set may be associated with a predetermined subset of system memory. Thus, a hit/miss engine 150 need only compare a newly received address against the contents of the tag field 130 in one of the sets to determine whether the data request hits the cache 100. In this regard, caches are well known.

According to an embodiment, the present invention provides a unique allocation/replacement manager 160 for use in a cache. The ARM 160 may operate according to a default replacement policy, such as the least recently used policy described above. The ARM 160 also may facilitate processing associated with the DEALLOCATE instruction. The ARM 160 may allocate cache lines 110 for storage of newly received data. In doing so, it may cause other cache lines (called "victim lines") to be evicted to make room for the newly received data.

The eviction identification registers 170 identify a cache line that is next in turn to be allocated. For a set-associative cache, such as the embodiment shown in FIG. 1, an eviction identification register 170 may be provided for each of the sets in the cache identifying the next data item to be evicted from the respective set.

Figure 2:
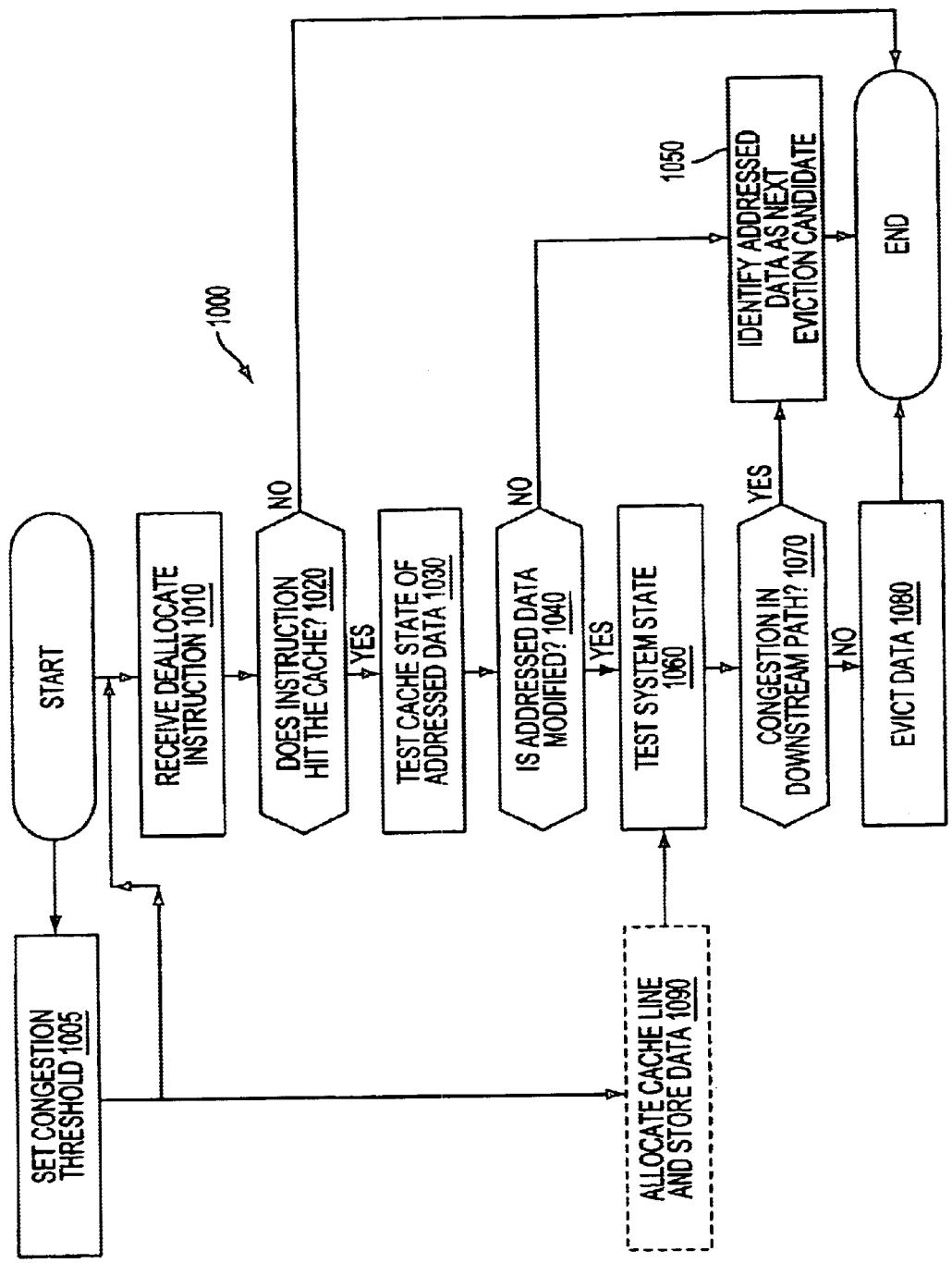
FIG. 2 is a flow diagram illustrating operation of a cache according to an embodiment of the present invention.

FIG. 2 is a flow diagram illustrating operation 1000 of a cache 100 according to an embodiment of the present invention. This embodiment is most appropriate for use in an integrated circuit having a single level cache system. The operation 1000 may begin with a congestion threshold being set (Box 1005), as will be described later. The operation 1000 may continue when a cache 100 receives a data request generated according to a DEALLOCATE instruction (Box 1010). As described below, a processor core (not shown) typically interprets and executes program instructions. During the execution of the DEALLOCATE instruction, the processor core may generate a data request signal to the cache 100 identifying at least an operation to be performed (e.g., load, store, DEALLOCATE) and an address of the data.

When the cache 100 receives a DEALLOCATE data request, the cache 100 may determine whether the request hits the cache 100 (Box 1020) or whether it misses the cache 100. In this regard the cache 100 may perform operations that are conventional to other hit/miss determinations for caches. A "hit" occurs if there is a match between an address references in the data request signal and an address tag stored in the cache 100. If the DEALLOCATE data request misses the cache, then the operation 1000 may terminate.

If the DEALLOCATE data request hits the cache, then the cache 100 may test the state of the addressed data and determine whether the data has been modified (Boxes 1030, 1040). If the data has not been modified, the cache 100 may identify the addressed data as the next eviction candidate (Box 1050). If the data has been modified, in an embodiment, the cache may test system status and determine whether the system is operating in a congested state (Box 1060, 1070). If the system is congested, the cache 100 may identify the addressed data as the next eviction candidate (Box 1050). Otherwise, if the system is not operating in a congested state, the cache manager may evict the modified cache line at this point in time (Box 1080). Thus, the data addressed by the DEALLOCATE instruction can be evicted immediately.

According to an embodiment, to implement an atomic STORE/DEALLOCATE instruction, the operation 1000 may begin with the congestion threshold being set at box 1005 and continue at box 1090 with the allocation and storage of data in the cache. From box 1090, the operation 1000 may advance to box 1060 to test the system state. Thereafter, the operation 1000 may progress as has been described above. The STORE/DEALLOCATE instruction thus causes new data to be stored in a cache and immediately designated for eviction.

The principles of the present invention find application with alternate embodiments. For example, in a first alternate embodiment, if it is determined that the system is not operating in a congested state, the operation may mark a cache line as a next candidate for eviction rather than actually evicting the cache line as is shown in FIG. 2. In this embodiment, if the system is congested, the operation may do nothing and permit the default replacement policies to govern the timing of eviction from the cache. This embodiment provides an added advantage by reducing the eviction load in the system over the embodiment illustrated in FIG. 2.

A second alternate embodiment provides for simpler operation than the embodiment of FIG. 2. In this embodiment, when a cache receives a DEALLOCATE data request, the cache simply may determine whether the data request hits the cache and, if so, marks the cache line as the next candidate for eviction. There need not be any testing of system state to identify congestion events. This alternate embodiment may provide for simpler operation over the embodiment of FIG. 2.

Consider operation of the cache in the context of the set-associative cache of FIG. 1. The operation of FIG. 2 may cause an addressed data item to be entered in one of the eviction identification registers 170 as the next data item to be evicted. In a set-associative cache, however, data may be evicted from one set independently of data eviction in the other sets. Accordingly, in an embodiment for use with a set-associative cache, the DEALLOCATE instruction may cause a data item to be identified as the next candidate to be evicted from a respective set rather than as the next candidate to be evicted from the entire cache. The deallocated data would be evicted when the ARM 160 needs to make room for new data having an address in the same set.

Figure 3:
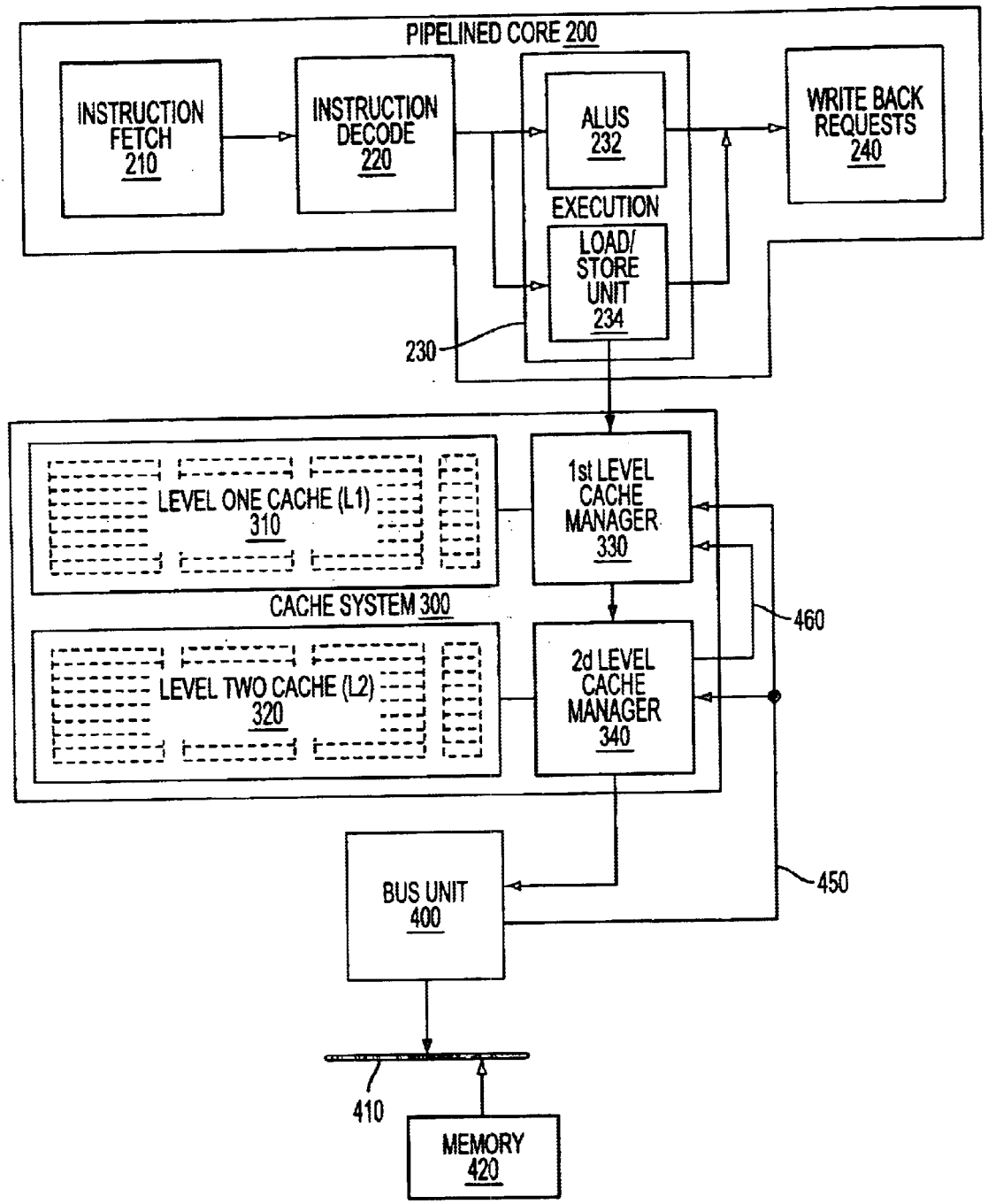
FIG. 3 is a functional block diagram of an integrated circuit according to an embodiment of the present invention.

FIG. 3 is a functional block diagram of an integrated circuit according to an embodiment of the present invention. The integrated circuit may include a pipelined core 200, a multi-level cache system 300 and a bus interface unit 400.

The pipelined core 200 may include four or more stages for instruction execution. It may include an instruction fetch stage 210, an instruction decode stage 220, an execution stage 230 and a data return stage 240. The instruction fetch stage 210 may retrieve instructions for execution. The instruction decode stage 220 may decode the retrieved instructions. As is known, different instruction may be processed by different elements within the execution stage 230. The example of FIG. 3 illustrates two such elements, an arithmetic logic stage 232 and a load/store stage 234. The decoding stage 220 may pass decoded instructions to appropriate elements within the execution stage 230. DEALLOCATE instructions may be forwarded to the load/store unit 234. The write-back stage 240 may update architectural state such as registers.

The integrated circuit may include a cache system 300 that includes one or more levels 310, 320 of cache. Each cache level 310, 320 may be associated with a respective cache manager 330, 340. A first level cache manager 330 may be provided in communication with the pipeline core 200. A second level cache manager 340 may be provided in communication with the first level cache manager 330. The cache system 300 may include further levels of cache as may be desired. Eventually, a highest level of cache may be provided in communication with the bus interface unit 400.

The bus interface 400 may interface with a system bus 410 that interconnects the integrated circuit with other agents of a computing system, such as system memory 420, bridge circuits and processors. The bus interface 400 may manage bus transactions to request data and respond to data requests from other agents. According to an embodiment, the bus interface 400 also may provide a congestion indicator signal 450 identifying a level of congestion on the system bus 410. This congestion indicator signal may be input to the cache managers 330, 340 of the cache system 300.

As is known in processing circuits, data requests from a pipeline core 200 may be input to lower level caches first and propagate further to higher level caches. For read requests, for example, each cache layer may determine a hit or miss. If a cache determines that the request hits the cache, the cache furnishes the requested data. If not, the data request propagates to successively higher layers of cache and eventually may be posted on the system bus as an external bus transaction.

Figure 4:
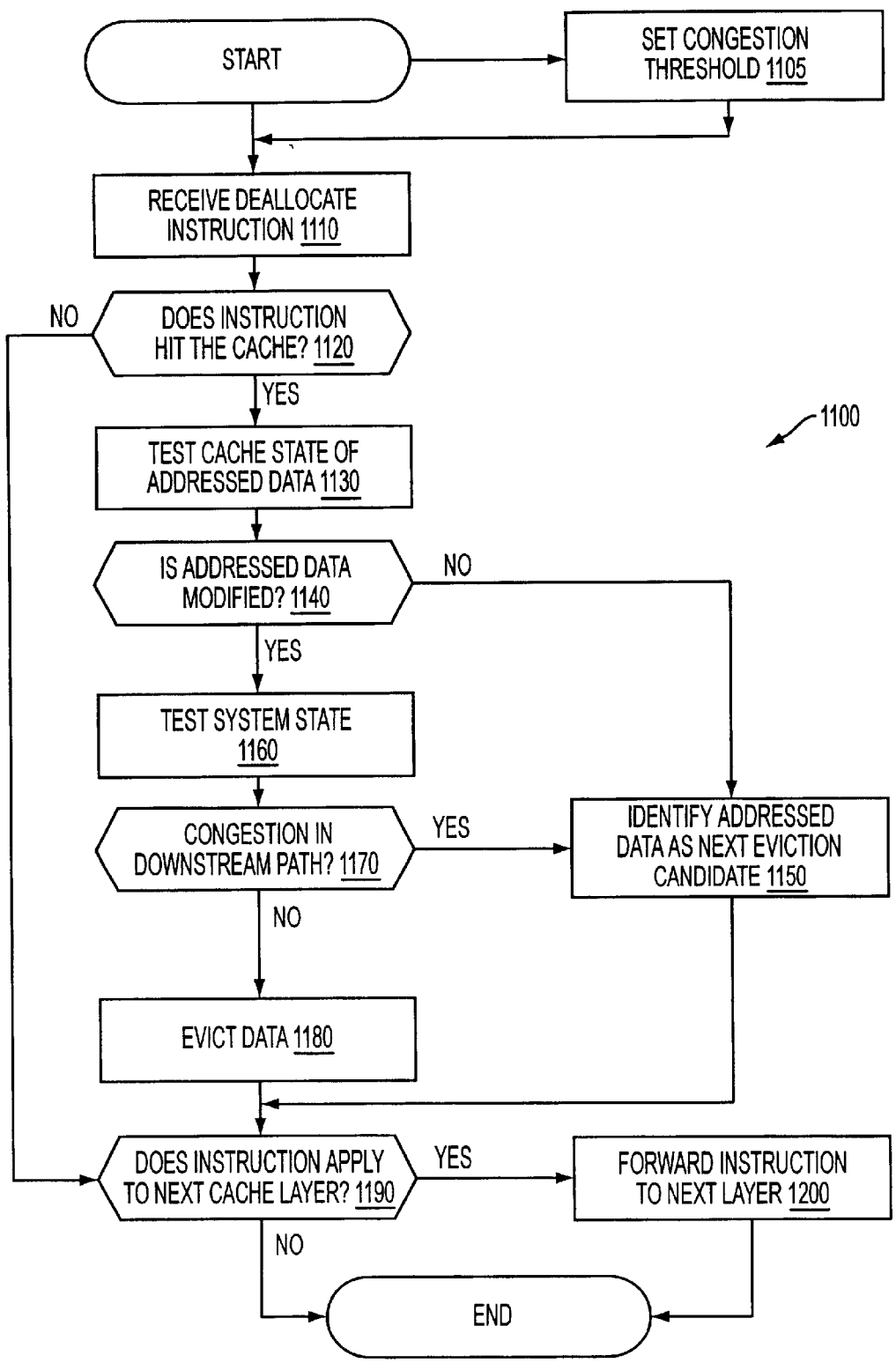
FIG. 4 is a flow chart illustrating operation of a cache in another embodiment of the present invention.

FIG. 4 is a flow chart illustrating operation of each cache in a multi-layer cache embodiment. The operation 1100 may begin with a congestion threshold being set (Box 1105), as will be described later. The operation 1100 may continue when a cache receives a data request generated according to a DEALLOCATE instruction (Box 1110). As described below, a processor core (not shown) typically interprets and executes program instructions; during the execution of the DEALLOCATE instruction, the processor core may generate a data request signal to the cache. According to an embodiment, for a DEALLOCATE instruction, the processor core may issue a data request for having a characteristic that distinguishes it from other data requests that the processor core may issue to a cache.

When the cache receives a DEALLOCATE data request, the cache may determine whether the request hits the cache (Box 1120) or whether it misses the cache. If the DEALLOCATE data request misses the cache, then the cache may determine whether to forward the data request to successive levels of cache (Box 1190, described below).

If the DEALLOCATE data request hits the cache, then the cache may test the state of the addressed data and determine whether the data has been modified (Boxes 1130, 1140). If the data has not been modified, the cache may identify the addressed data as the next eviction candidate (Box 1150). If the data has been modified, in an embodiment, the cache may test system status and determine whether the system is operating in a congested state (Box 1160, 1170). If the system is congested, the cache simply may identify the addressed data as the next eviction candidate (Box 1150). Otherwise, if the system is not operating in a congested state, the cache manager may designate the addressed data as a candidate for immediate eviction (Box 1180). Thus, the data addressed by the DEALLOCATE instruction will be the next data to be evicted.

Following execution of the operations at boxes 1150 or 1180, the operation may determine whether the DEALLOCATE data request should be forwarded to a next cache layer (Box 1190). If so, the cache may forward the DEALLOCATE data request to the cache manager in a next cache layer (Box 1200). Thereafter, or if the DEALLOCATE data request should not be forwarded to a next cache layer, the operation 1100 may terminate.

As in the embodiment of FIG. 2, the STORE-DEALLOCATE instruction also may cause data to be stored in a cache and may advance operation to box 1170. This operation has been omitted from the presentation of FIG. 4 for the sake of clarity.

As noted above, embodiments of the present invention permit the proposed instructions to be directed to specified levels of cache. In such an embodiment, the pipelined core 200 may decode the instructions and generate a data request to the cache system 300 that identifies the layers of cache to which the data request is directed. For those instructions that explicitly identify cache levels for deallocation, the instruction decoding unit 220 may decode the instructions and generate a data request identifying the cache levels. For those instructions that abstractly identify the cache levels for deallocation, the instruction decoding unit 220 may contain a mapping that corresponds the high or low indicators to specific levels of cache and thereafter may generate a data request identifying the cache levels.

As described above, a decision to deallocate a data item may be based on a congestion indication from a system bus. Embodiments of the present invention permit other congestion indicators may be used to control the deallocation operation. For example, as is known, an integrated circuit may contain several transaction queues provided between the different levels of cache and also between the cache system and the bus interface unit. These transaction queues are well known but have been omitted from FIG. 3 for the sake of clarity. Typically, they store other data requests that await processing. These queues also may be adapted to generate a congestion indicator signal that may be input to the cache managers 330, 340 of lower level caches. Further, cache managers 340 from higher-level caches 320 also may generate congestion indicators that may be returned to the cache managers 330 of lower level caches 310. One such congestion indicator is shown in FIG. 3 as 460.

According to an embodiment of the present invention, a system congestion decision may be based upon a comparison of an actual congestion indicator and a threshold congestion indicator. This threshold congestion indicator may be a predetermined threshold indicator as would be established through system simulation during a design phase of the integrated circuit. Alternatively, the threshold congestion indicator may be a variable value that may be updated by the integrated circuit during operation or may be programmed by user-control such as through a software command.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A cache management method, comprising, responsive to a predetermined program instruction addressing a data item, designating the data item as a next candidate for eviction, wherein the designating is permissive.

2. A cache management method, comprising, responsive to a predetermined program instruction addressing a data item, designating the data item as a next candidate for eviction, further comprising, prior to the designating:
   determining an operating status condition,
   comparing the operating status condition to a threshold, and
   performing the designating if the operating status condition exceeds the threshold.

3. The cache management method of claim 2, wherein the operating status condition is congestion on a system bus.

4. The cache management method of claim 2, wherein the operating status condition is congestion in a transaction queue of an integrated circuit.

5. A cache management method, comprising, responsive to a predetermined program instruction addressing a data item, designating the data item as a next candidate for eviction, further comprising, responsive to the program instruction, storing the data item in a cache prior to the designating.

6. A cache for a processor, comprising:
   a plurality of cache lines, and
   a cache manager having logic therein to designate a cache line as a next candidate for eviction, responsive to a predetermined data request and unless the cache receives a data signal indicating that the processor is operating in a state of congestion.

7. The cache of claim 6 wherein the cache manager further forwards the predetermined data request to a next level of cache.

8. The cache of claim 6, further comprising an eviction identification register to store an identifier of a cache line responsive to the designation.

9. The cache of claim 6, wherein the cache is a set-associative cache and further comprises a plurality of eviction identification registers, one for each set in the cache, each register to store an identifier of a cache line as the next candidate for eviction from a respective set.

10. A cache management method, comprising, responsive to a data request:
    if the data request hits a cache, testing a state of an addressed data item, and
    identifying the addressed data item as a next eviction candidate unless the state of the data item indicates that the data item is modified.

11. The cache management method of claim 10, further comprising, if the data item is modified:
    determining an operating status condition,
    comparing the operating status condition to a threshold, and
    performing the designating if the operating status condition exceeds the threshold.

12. The cache management method of claim 11, wherein the operating status condition is congestion on a system bus.

13. The cache management method of claim 11, wherein the operating status condition is congestion in a transaction queue of an integrated circuit.

14. The cache management method of claim 10, further comprising:
    determining whether the data request refers to a next level of cache, and
    if so, forwarding the data request to the next level of cache.

15. A cache management method, comprising:
    during execution of a program instruction that addresses a data item and indicates that the data item is unlikely to be used again during later program execution:
    storing the data item within a cache, and
    designating the stored data item as a next candidate for eviction from the cache.

16. The cache management method of claim 15, further comprising, prior to the designating:
    determining an operating status condition,
    comparing the operating status condition to a threshold, and
    performing the designating if the operating status condition exceeds the threshold.

17. The cache management method of claim 15, further comprising:
    determining whether the data request refers to a next level of cache, and
    if so, forwarding the data request to the next level of cache.

18. A computer readable medium storing at least one program instruction that when executed by a processor, causes the processor to designate an addressed data item as a next candidate for eviction from the processor, wherein the instruction is an atomic transaction, one that causes the processor first to store the data in a processor cache prior to designating the addressed data item as a next candidate for eviction.

19. A cache management method, comprising, responsive to a predetermined program instruction:

determining whether a congestion condition exists, and unless a congestion condition exists, evicting an addressed data item from the cache.

20. The cache management method of claim 19, further comprising, if a congestion condition exists, designating the addressed data item as a next candidate for eviction.

21. The cache management method of claim 19, wherein the determining comprises comparing a congestion indicator against a congestion threshold, the congestion threshold being set by program instruction.

22. The cache management method of claim 19, wherein the determining comprises comparing a congestion indicator against a variable congestion threshold.

23. An instruction stored in a computer readable medium that when executed by a processor causes the processor to:

determine whether data specified by the instruction is stored in a cache of the processor; and if so, identify the specified data as the next candidate for eviction from the cache according to a cache eviction scheme.

24. The instruction of claim 23, wherein the instruction specifies a level of cache in which the determination is to occur.

25. The instruction of claim 23, wherein the instruction specifies a set of a set-associative cache in which the determination is to occur.

26. The instruction of claim 23, wherein the specified data is evicted immediately upon identification.

27. The instruction of claim 23, wherein the specified data is evicted immediately upon identification unless the processor is operating in a congested state.

28. The instruction of claim 23, wherein the instruction causes the processor to forward the instruction to a next level of cache if the data is not stored in the cache.

29. The instruction of claim 23, wherein the instruction indirectly specifies the level of cache to which the determination is directed.

30. The instruction of claim 23, wherein, as part of the identification, the instruction causes an eviction pointer to point to the specified data in the cache.

31. An instruction stored in a computer readable medium that when executed by a processor causes the processor to:

determine an operating status condition of the processor;

identify data specified by the instruction as the next candidate for eviction from a cache of the processor if the condition exceeds a predetermined threshold; and otherwise, ignore the instruction.

32. The instruction of claim 31, wherein the instruction is a DEALLOCATE instruction.

33. The instruction of claim 31, wherein the instruction further causes the processor to store the data in the cache prior to the identifying.

34. The instruction of claim 31, wherein the operating status condition indicates congestion on a system bus.

35. The instruction of claim 31, wherein the operating status condition indicates congestion in a transaction queue of the processor.

36. The instruction of claim 31, wherein the identification causes the processor to update an eviction pointer in the cache to point to the data.

37. The instruction of claim 31, wherein the identification causes the processor to:

determine the state of the data;

if the data has not been modified, determine whether the condition exceeds the predetermined threshold;

if so, advance the data for out-of-order eviction based on a default cache eviction scheme.

38. The instruction of claim 31, wherein the instruction causes the data to be evicted immediately upon identification.

* * * * *